US012427668B2

(12) United States Patent
Lee et al.

(10) Patent No.: US 12,427,668 B2
(45) Date of Patent: Sep. 30, 2025

(54) METHOD AND SYSTEM FOR HEALTH MONITORING OF COLLABORATIVE ROBOT (71) Applicant: AJOU UNIVERSITY INDUSTRY-ACADEMIC COOPERATION FOUNDATION, Suwon-si (KR)

(72) Inventors: Jung Won Lee, Seoul (KR); Ye Seul Park, Incheon (KR); Dong Yeon Yoo, Suwon-si (KR); Jin Se Kim, Anyang-si (KR)

(73) Assignee: AJOU UNIVERSITY INDUSTRY-ACADEMIC COOPERATION, Suwon-Si (KR)

( * ) Notice: Subject to any disclaimer, the term of this patent is extended or adjusted under 35 U.S.C. 154(b) by 220 days.

(21) Appl. No.: 17/972,550

(22) Filed: Oct. 24, 2022

(65) Prior Publication Data
US 2023/0131202 A1   Apr. 27, 2023

(30) Foreign Application Priority Data

Oct. 25, 2021 (KR) .......... 10-2021-0142654

(51) Int. Cl.
B25J 9/16         (2006.01)
B25J 13/00        (2006.01)

(52) U.S. Cl.
CPC .......... B25J 9/1674 (2013.01); B25J 9/1653 (2013.01); B25J 13/006 (2013.01)

(58) Field of Classification Search
CPC .... B25J 9/1653; B25J 19/0095; B25J 9/1674; B25J 13/006; G05B 2219/39413
See application file for complete search history.

(56) References Cited

U.S. PATENT DOCUMENTS

| | | | |
|---|---|---|---|
| 9,024,771 B1* | 5/2015 | Kuffner, Jr. ............ | B25J 9/0084 340/679 |
| 2007/0288202 A1* | 12/2007 | Sirgany .................. | B05B 12/00 702/182 |
| 2009/0143913 A1* | 6/2009 | Kim ....................... | B25J 19/023 701/469 |
| 2010/0191372 A1* | 7/2010 | Nihei ...................... | F16P 1/00 700/245 |
| 2017/0248936 A1* | 8/2017 | Hoshino ............ | G05B 19/4061 |
| 2018/0099413 A1* | 4/2018 | Naitou .................. | B25J 9/1674 |
| 2018/0164779 A1* | 6/2018 | Kim .................. | G05B 19/4063 |
| 2018/0250834 A1* | 9/2018 | Choo ........................ | B25J 9/16 |
| 2018/0361578 A1* | 12/2018 | Muneto .................. | B25J 9/1605 |
| 2020/0282563 A1* | 9/2020 | Taguchi ............. | G05B 19/4065 |

FOREIGN PATENT DOCUMENTS

| | | |
|---|---|---|
| JP | 2004-020388 A | 1/2004 |
| JP | 2016-100026 A | 5/2016 |
| WO | WO-2021078344 A1 * 4/2021 | ........... G05B 19/423 |

* cited by examiner

Primary Examiner — Stephen Holwerda
(74) Attorney, Agent, or Firm — Foley & Lardner LLP (57) ABSTRACT A method and system for health monitoring of a collaborative robot are provided. The method includes calling a test program installed in a collaborative robot for health monitoring of the collaborative robot when the collaborative robot satisfies a call condition of the test program, performing a test by operating the collaborative robot based on the test program, and collecting and analyzing a result of the test by the collaborative robot.

5 Claims, 7 Drawing Sheets

FIG. 7 robot health examination record

| robot information | | | |
|---|---|---|---|
| robot ID | | registration No. | |
| date | | installation place | |

— 701

| operating environment information | | | |
|---|---|---|---|
| load | temperature | humidity | power |
| | | | |

— 703

| health examination record | | | | | | | |
|---|---|---|---|---|---|---|---|
| joint No. | function-ality | examination data | reference value | starting-on | | task completion | |
| | | | | examination result | state | examination result | state |
| 1 | exercise | location | | | | | |
| | | speed | | | | | |
| | | angle | | | | | |
| | control | torque | | | | | |
| | | vibration | | | | | |
| | inside | current | | | | | |
| | | voltage | | | | | |
| | | temperature | | | | | |
| 2 | exercise | location | | | | | |
| | | speed | | | | | |
| | | angle | | | | | |
| | control | torque | | | | | |
| | | vibration | | | | | |
| | inside | current | | | | | |
| | | voltage | | | | | |
| | | temperature | | | | | |
| ⋮ | | | | | | | |
| N | exercise | location | | | | | |
| | | speed | | | | | |
| | | angle | | | | | |
| | control | torque | | | | | |
| | | vibration | | | | | |
| | inside | current | | | | | |
| | | voltage | | | | | |
| | | temperature | | | | | |

— 705

| examination opinion |
|---|
| |

METHOD AND SYSTEM FOR HEALTH MONITORING OF COLLABORATIVE ROBOT

CROSS REFERENCE TO RELATED APPLICATION

The present application claims priority to Korean Patent Application No. 10-2021-0142654, filed 25 Oct. 2021, the entire contents of which is incorporated herein for all purposes by this reference.

BACKGROUND OF THE INVENTION

Field of the Invention

The present invention relates to a method and system for health monitoring of a collaborative robot.

Description of the Related Art

Various equipment operating in industrial sites perform product production and processing through organic operations. If a failure occurs in any one of these various equipment, it may lead to a decrease in overall production efficiency of the industrial site and defective products. Therefore, there is a need for a method capable of identifying the health degradation of the equipment and performing repair before the failure of the equipment occurs.

Accordingly, health evaluation is currently being performed through statistical analysis of various sensing data generated by equipment in consideration of the type of tasks performed by various equipment and operating environments. However, unlike industrial equipment, where the type of tasks to be performed is limited, when using a collaborative robot programmed to perform various tasks, data patterns are complicated due to the diversity of task programs, making it difficult to perform health evaluation with a fixed analysis technique.

For this reason, a tester may heuristically perform the health evaluation of the collaborative robot, or design one program that performs a fixed action independently of the task of the collaborative robot, and perform the health evaluation of the collaborative robot using the sensing data generated by an action according to the designed program. However, in the case of this method, although it is possible to diagnose the overall states of the collaborative robot, detailed diagnosis of each component constituting the collaborative robot is not possible, so it is difficult to guarantee the operation of the program and the periodicity of the test.

SUMMARY OF THE INVENTION

Embodiments of the present invention for solving these conventional problems provide a method and system for health monitoring of a collaborative robot which can perform real-time or periodic health monitoring of the collaborative robot based on sensing data acquired based on a program that corresponds to each component having the collaborative robot and is installed in the collaborative robot.

In addition, embodiments of the present invention provide a method and system for health monitoring of a collaborative robot that can ensure operation time of a program and periodicity of tests by operating the program installed in the collaborative robot at the time of starting the collaborative robot and after performing the task of the collaborative robot.

A method for health monitoring according to an embodiment of the present invention comprising calling a test program installed in a collaborative robot for health monitoring of the collaborative robot when the collaborative robot satisfies a call condition of the test program, performing a test by operating the collaborative robot based on the test program, and collecting and analyzing a result of the test by the collaborative robot.

In addition, the calling a test program comprises calling the test program when at least one of a starting-on of the collaborative robot and a completion of task performance in the collaborative robot is satisfied.

In addition, the calling a test program comprises calling the test program including at least one unit program designed to correspond to at least one joint provided in the collaborative robot.

In addition, a parameter for operating the joint is set in the unit program in consideration of a maximum operation range, maximum operating speed, and maximum number of operations of the joint.

In addition, the performing a test comprises performing the test according to the called test program in a situation converging to a control condition including a data condition, an action condition, a load condition, an operating condition, and an environmental condition.

In addition, the collecting and analyzing a result of the test comprising acquiring sensing data for the test and generating analysis data by calculating an average value of the sensing data acquired based on the unit program.

In addition, the method further comprising, after the collecting and analyzing a result of the test, the sensing data and the analysis data are transmitted.

Also, a method for health monitoring according to an embodiment of the present invention comprising calling a test program for health monitoring of a collaborative robot when the collaborative robot satisfies a call condition of the test program, transmitting, by the collaborative robot, test data acquired according to a test performed based on the test program, identifying health of the collaborative robot by analyzing the test data by a monitoring device, and display uniting the identified health of the monitoring device.

In addition, the call condition of the test program satisfies at least one of a starting-on of the collaborative robot and a completion of task performance in the collaborative robot.

In addition, the calling a test program comprises calling the test program including at least one unit program designed to correspond to at least one joint provided in the collaborative robot.

In addition, a parameter for operating the joint is set in the unit program in consideration of a maximum operation range, maximum operating speed, and maximum number of operations of the joint.

In addition, the transmitting test data comprising performing the test according to the called test program in a situation that converges to a control condition, acquiring sensing data for the test, generating analysis data by calculating an average of the sensing data acquired based on the unit program, and transmitting the sensing data and the analysis data.

In addition, the identifying health of the collaborative robot comprises identifying at least one of a daily examination record of the collaborative robot and a health monitoring result of the collaborative robot.

In addition, the daily examination record comprises the joint information, reference data for the joint, the test data, and a difference value between the reference data and the test data.

In addition, the health monitoring result comprises a change value in data over time based on the sensing data and the analysis data, the daily examination record by a date, and a degree of aging of the at least one joint.

In addition, the displaying the health comprises displaying a form in which the daily examination record is recorded.

In addition, the displaying the health comprises displaying the health monitoring result.

Also, a system for health monitoring according to an embodiment of the present invention comprising a collaborative robot that calls a test program for health monitoring when a call condition of the test program is satisfied, performs a test, and transmits test data acquired according to the performed test, and a monitoring device that analyzes the test data to identify and display unit health of the collaborative robot.

In addition, the system further comprising a server that receives the test data acquired from the collaborative robot and transmits the received test data to the monitoring device.

DETAILED DESCRIPTION OF THE INVENTION

Hereinafter, preferred embodiments according to the present invention will be described in detail with reference to the accompanying drawings. The detailed description set forth below in conjunction with the accompanying drawings is intended to describe exemplary embodiments of the present invention and is not intended to represent the only embodiments in which the present invention may be practiced. In order to clearly describe the present invention in the drawings, parts not related to the description may be omitted, and the same reference numerals may be used for the same or similar components throughout the specification.

Figure 1:
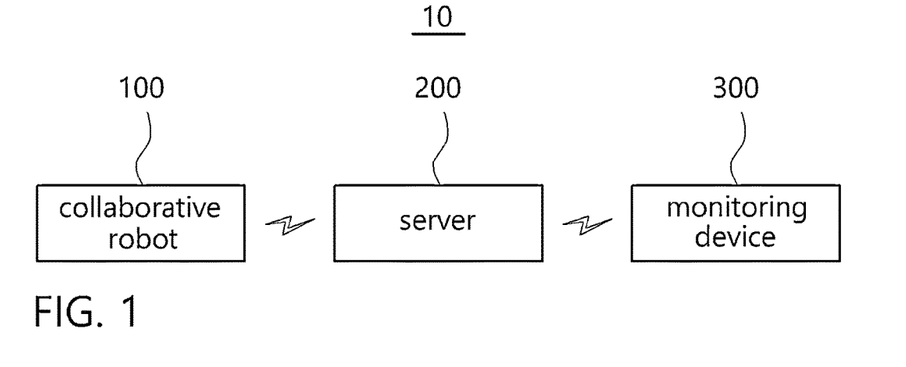
FIG. 1 is a diagram illustrating a health monitoring system of a collaborative robot according to an embodiment of the present invention.
Figure 2:
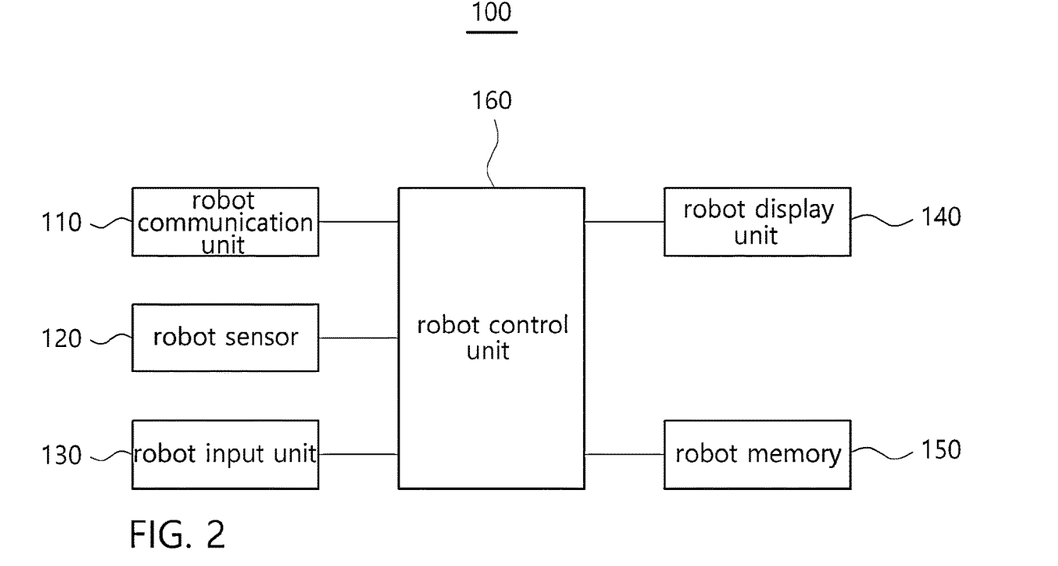
FIG. 2 is a diagram illustrating a main configuration of a collaborative robot for health monitoring of a collaborative robot according to an embodiment of the present invention.
Figure 3:
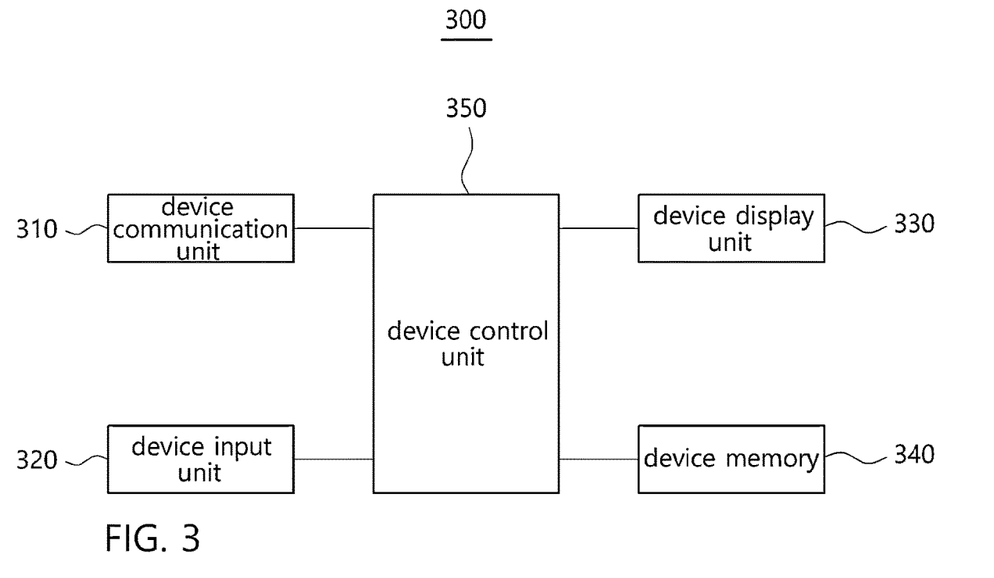
FIG. 3 is a diagram illustrating a main configuration of a monitoring device for health monitoring of a collaborative robot according to an embodiment of the present invention.

FIG. 1 is a diagram illustrating a health monitoring system of a collaborative robot according to an embodiment of the present invention. FIG. 2 is a diagram illustrating a main configuration of a collaborative robot for health monitoring of a collaborative robot according to an embodiment of the present invention. FIG. 3 is a diagram illustrating a main configuration of a monitoring device for health monitoring of a collaborative robot according to an embodiment of the present invention.

Referring to FIGS. 1 to 3, a monitoring system 10 according to the present invention includes a collaborative robot 100, a server 200, and a monitoring device 300.

The collaborative robot 100 is a type of robots that are programmed to perform various tasks and used in industrial sites, and refers to a robot that is put into delicate tasks that require human participation, and performs the tasks in connection with humans. The collaborative robot 100 acquires sensing data according to the action of the collaborative robot 100 and transmits it to the server 200.

Although not illustrated, the collaborative robot 100 includes at least one joint, and in an embodiment of the present invention, it will be described as an example including a plurality of joints. In addition, although one collaborative robot 100 is described as an example in the embodiment of the present invention, the present invention is not limited thereto, and a plurality of collaborative robots may be included in the monitoring system 10 to be implemented.

The collaborative robot 100 will be described in more detail with reference to FIG. 2. Referring to FIG. 2, the collaborative robot 100 includes a robot communication unit 110, a robot sensor 120, a robot input unit 130, a robot display unit 140, a robot memory 150 and a robot control unit 160.

The robot communication unit 110 transmits the sensing data acquired from the robot sensor 120 to the server 200 through communication with the server 200. To this end, the robot communication unit 110 may perform wireless communication such as 5th generation communication (5G), long term evolution (LTE), long term evolution-advanced (LTE-A), and wireless fidelity (Wi-Fi), and perform wired communication using a cable. In addition, although it is described that the robot communication unit 110 performs communication with the server 200 in an embodiment of the present invention, this is for illustrative purposes, and the robot communication unit 110 may perform communication with the monitoring device 300.

The robot sensor 120 includes a plurality of sensors provided in at least one of the inside and outside of each joint of the collaborative robot 100. The robot sensor 120 acquires raw data corresponding to the action of each joint as sensing data. The robot sensor 120 transmits the acquired sensing data to the robot control unit 160.

The robot input unit 130 generates input data in response to an input of a user of the collaborative robot 100. To this end, the robot input unit 130 may include an input unit such as a keyboard, a mouse, a keypad, a dome switch, a touch panel, a touch key, a button and the like.

The robot display unit 140 outputs output data according to the action of the collaborative robot 100. To this end, the robot display unit 140 may include a display unit device such as a liquid crystal display unit (LCD), a light emitting diode (LED) display unit, an organic light emitting diode (OLED) display unit and the like. In addition, the robot display unit 140 may be implemented in the form of a touch screen in combination with the robot input unit 130.

The robot memory 150 stores a test program designed to acquire sensing data by operating the collaborative robot 100. The test program may be designed to operate the collaborative robot 100 according to at least one control condition. More specifically, the test program is designed to include a separate unit program corresponding to each joint in order to have a certain level of operation range, operation speed, and number of operations compared to the maximum operation range in the specification for each joint of the collaborative robot 100.

In this case, the test program may be designed to acquire sensing data of the same environment by fixing parameters according to the characteristics and operating environment of the collaborative robot 100, and the purpose of health examination. The purpose of health examination may include the purpose of identifying the health of the collaborative robot 100 in a general situation and the purpose of identifying the health of the collaborative robot 100 in a situation where there is a risk of faults and failure of the collaborative robot 100. In a general situation, the parameter for identifying the health may be set in a range of operation of 60 to 70% compared to the specification of the collaborative robot 100. In addition, in a situation where there is a risk of faults and failures, the parameter may be set in a range of operation of 90% compared to the specification of the collaborative robot 100 for more detailed and strict diagnosis. This purpose of health examination may be determined according to the industrial site in which the collaborative robot 100 is installed. In addition, the numerical value of the operation range set as a parameter is a numerical value for convenience of description and is not necessarily limited thereto.

More specifically, a plurality of control conditions may be set in the test program so that the collaborative robot 100 acquires sensing data in the same environment. In this case, the control condition may include a data condition, an action condition, a load condition, an operating condition, and an environmental condition. The data condition refers to a condition for acquiring sensing data in a situation having the same characteristics, such as the same sensor, the same unit, and the same collection period. The action condition refers to a condition for acquiring sensing data when the collaborative robot 100 performs the same action. The load condition refers to a condition for acquiring sensing data in a situation in which a load, an action pattern, etc. are constantly applied to the collaborative robot 100. The operating condition refers to a condition for acquiring sensing data in a situation where the operating time of the collaborative robot 100 is the same. Finally, the environmental condition refers to a condition for acquiring sensing data in an operating environment in which the collaborative robot 100 acts, that is, in a situation in which temperature, humidity, etc. are the same.

The robot control unit 160 calls the test program stored in the robot memory 150 and executes the test program when at least one call condition among the starting-on and the completion of task performance of the collaborative robot 100 is satisfied. The robot control unit 160 drives the collaborative robot 100 according to the execution of the test program to acquire sensing data including location, speed, acceleration, temperature, voltage, current, torque and noise of at least one joint provided in the collaborative robot 100. In this case, since the test program acquires the sensing data in the same environment where the control condition is satisfied, the variable by the tester can be minimized, so that more accurate sensing data can be acquired.

The robot control unit 160 generates analysis data by calculating an average value of the sensing data acquired by a separate unit program corresponding to each joint. The robot control unit 160 transmits test data including the acquired sensing data and the generated analysis data to the server 200 through the robot communication unit 110.

The server 200 receives the test data acquired from the collaborative robot 100 from the collaborative robot 100 and transmits the received test data to the monitoring device 300. To this end, the server 200 may perform wireless communication such as $5^{th}$ generation communication (5G), long term evolution (LTE), long term evolution-advanced (LTE-A), and wireless fidelity (Wi-Fi), and may perform wired communication with the collaborative robot 100 using a cable. Although not illustrated, the server 200 may include a database for storing the test data received from the collaborative robot 100. When the monitoring system 10 is provided with a plurality of collaborative robots, the server 200 may have a database for each collaborative robot. In addition, although the server 200 is described as an essential component in an embodiment of the present invention, it is not necessarily limited thereto, and when direct communication between the collaborative robot 100 and the monitoring device 300 is possible, the server 200 does not have to be included in the system 10.

The monitoring device 300 is a device such as a computer or tablet PC, receives sensing data from the server 200, monitors the health of the collaborative robot 100, and display units the monitoring result. The monitoring device 300 will be described in more detail with reference to FIG. 3. Referring to FIG. 3, the monitoring device 300 includes a device communication unit 310, a device input unit 320, a device display unit 330, a device memory 340, and a device control unit 350.

The device communication unit 310 receives the sensing data acquired from the collaborative robot 100 through communication with the server 200 and provides the received sensing data to the device control unit 350. To this end, the device communication unit 310 may perform wireless communication such as $5^{th}$ generation communication (5G), long term evolution (LTE), long term evolution-advanced (LTE-A), and wireless fidelity (Wi-Fi), and perform wired communication using a cable.

The device input unit 320 generates input data in response to a user input of the monitoring device 300. To this end, the device input unit 320 may include an input unit such as a keyboard, a mouse, a keypad, a dome switch, a touch panel, a touch key, and a button.

The device display unit 330 outputs output data according to the action of the monitoring device 300. To this end, the device display unit 330 may include a display unit device such as a liquid crystal display unit (LCD), a light emitting diode (LED) display unit, an organic light emitting diode (MED) display unit and the like. In addition, the device display unit 330 may be implemented in the form of a touch screen in combination with the device input unit 320.

The device memory 340 stores the action programs of the monitoring device 300. The device memory 340 stores sensing data received from the server 200 and stores reference data for the collaborative robot 100. In this case, the reference data is the sensing data measured at the time of shipment, which is the sensing data measured in the same environment as the environment in which the test program operates, and is for each of a plurality of joints provided in the collaborative robot 100.

The device control unit 350 receives test data from the server 200 through the device communication unit 310. In this case, the test data may include sensing data that is raw data acquired by the robot sensor 120 of the collaborative robot 100 and analysis data generated by analyzing the sensing data by the robot control unit 160.

When an examination record request signal for identifying a daily examination record of the collaborative robot 100 is received from the device input unit 320, the device control unit 350 identifies the sensing data included in the received test data. The device control unit 350 inputs the identified sensing data as a daily examination record in an examination record table. The device control unit 350 display units the examination record table in which the daily examination record is input on the device display unit 330. In this case, robot information, operating environment information, health examination record, and examination opinion record may be input in the examination record table.

The robot information refers to basic information on an identification (ID) assigned to the collaborative robot 100, a registration number of the collaborative robot 100, an operation date, an installation location, and the like. The operating environment information refers to environmental information such as load, temperature, humidity, and power in the operation process of the collaborative robot 100. The health examination record refers to a sensing data value for all joints provided in the collaborative robot 100 on a corresponding date, and a reference data value for all joints, that is, a sensing data value at the time of shipment of the collaborative robot 100. Through this, the tester can identify the health state of the collaborative robot 100 by using a difference value between the sensing data value at the shipping time and the sensing data value at the current time. The examination opinion refers to the personal opinion of the tester after identifying the health state of the collaborative robot 100. In this case, the examination opinion may be directly input by the tester through the device input unit 320.

In addition, when a monitoring request signal for health monitoring is received, the device control unit 350 analyzes the test data received from the server 200. The device control unit 350 display units the health monitoring result of the collaborative robot 100 according to the analysis result of the test data on the device display unit 330. In this case, the health monitoring result may be display united by visualizing the joint number, monitoring period, data type, health evaluation, data monitoring, state monitoring, and health record.

The joint number indicates a number assigned to each of a plurality of joints provided in the collaborative robot 100. The monitoring period indicates a period in which the health of the collaborative robot 100 is monitored. The data type indicates the data type to identify in the joint selected by the joint number. In this case, the data type may include the data type assigned to the joint number, that is, location, speed, angle, torque, vibration, current, voltage, and temperature.

The health evaluation indicates a health level and a health value. The tester may identify the health level and health value of the collaborative robot 100 over time, that is, during the monitoring period, through the health evaluation.

The data monitoring predicts and graphs a reference data value that is a sensing data value for the collaborative robot 100 at the time of shipment, a sensing data value for the collaborative robot 100 before the monitoring period, a sensing data value for the collaborative robot 100 during the monitoring period, and a sensing data value for the collaborative robot 100 after the monitoring period. To this end, the device control unit 350 may generate a data monitoring graph by using a change in the sensed data values. Also, the device control unit 350 may predict the sensing data value for the collaborative robot 100 after the monitoring period by using the reference data value and the rate of change in the sensing data values during the monitoring period. Through this, the tester can predict when the collaborative robot 100 has a health reference value. The state monitoring is a graph showing the change value of the analysis data.

The health record is a table that outlines the results of the examination record table by date. The tester can clearly identify the health state of the collaborative robot 100 during the monitoring period through the health record.

Figure 4:
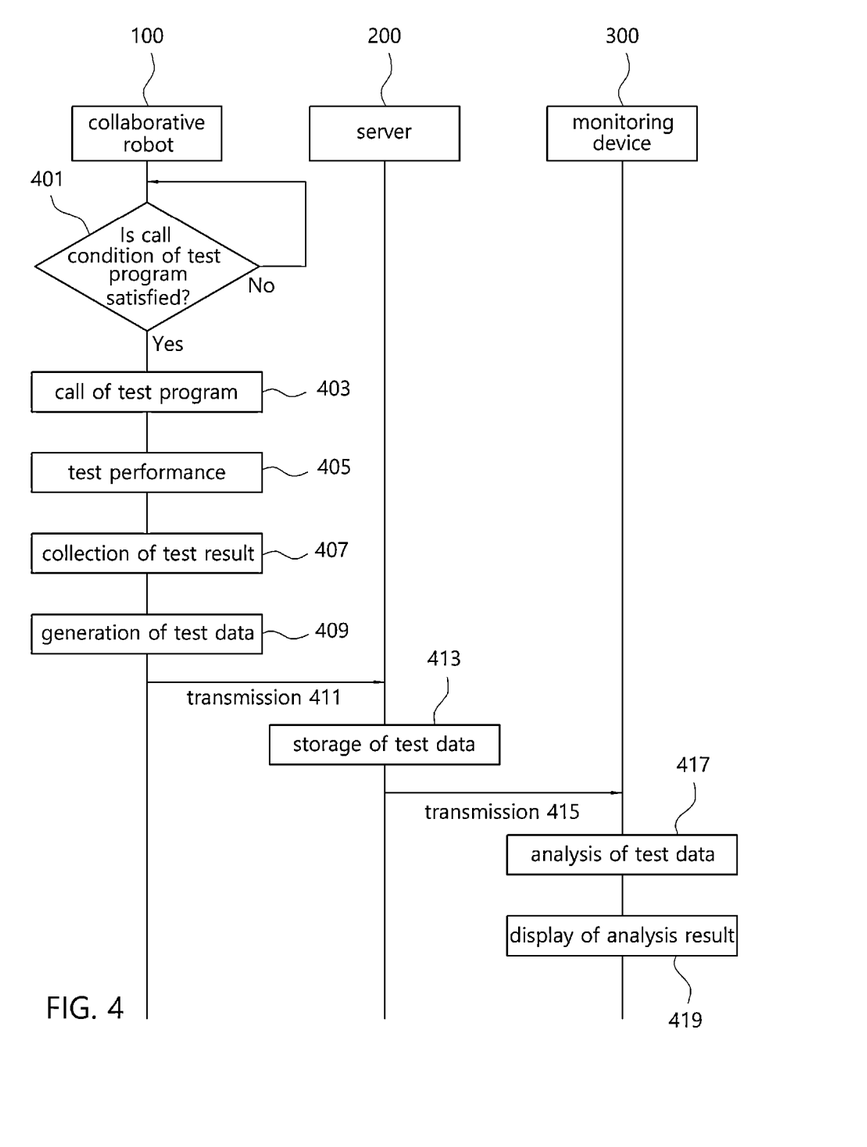
FIG. 4 is a flowchart illustrating a method for health monitoring of a collaborative robot according to an embodiment of the present invention.

FIG. 4 is a flowchart illustrating a method for health monitoring of a collaborative robot according to an embodiment of the present invention.

Referring to FIG. 4, in step 401, the collaborative robot 100 identifies whether the call condition of the test program is satisfied. As a result of identification in step 401, when the call condition is satisfied, in step 403, the collaborative robot 100 calls the test program installed in the collaborative robot 100 and performs step 405. In step 405, the collaborative robot 100 performs a test of the collaborative robot 100 according to the called test program. In step 407, the collaborative robot 100 acquires a test result according to the test execution. In this case, the test results may be acquired for each joint provided in the collaborative robot 100. In step 409, the collaborative robot 100 generates test data based on the acquired test result. The test data may include sensing data that is raw data and analysis data that is an average value of the sensing data.

In step 411, the collaborative robot 100 transmits the generated test data to the server 200. In step 413, the server 200 stores the test data. In step 415, the server 200 transmits the stored test data to the monitoring device 300. In step 417, the monitoring device 300 analyzes the test data and performs step 419. In step 419, the monitoring device 300 display units the analysis result of the test data.

Figure 5:
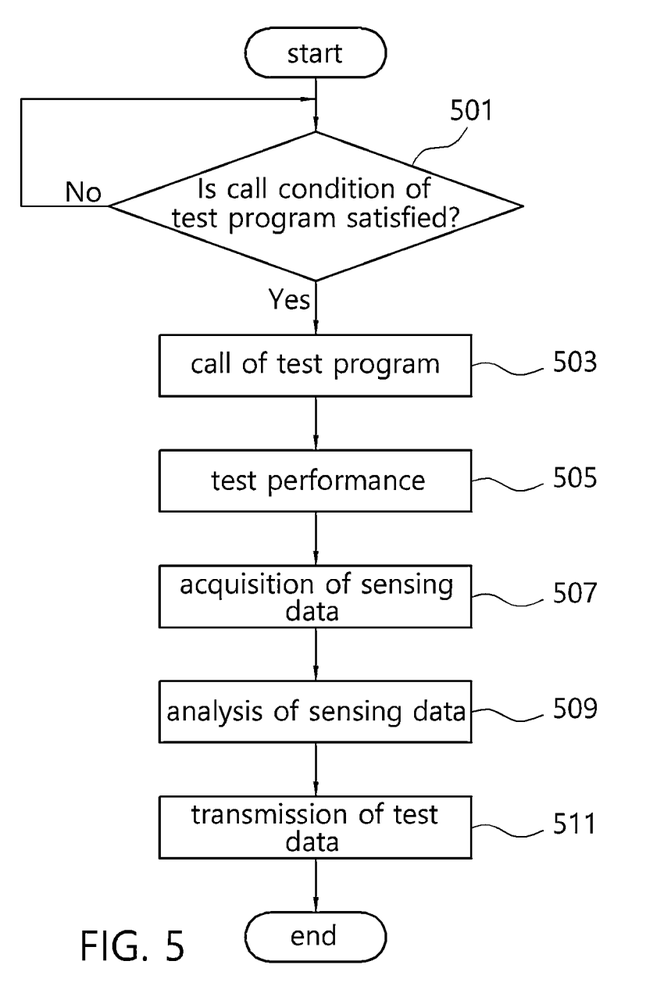
FIG. 5 is a flowchart illustrating a method for health monitoring of a collaborative robot in a collaborative robot according to an embodiment of the present invention.

FIG. 5 is a flowchart illustrating a method for health monitoring of a collaborative robot in a collaborative robot according to an embodiment of the present invention.

Referring to FIG. 5, in step 501, the robot control unit 160 identifies whether the collaborative robot 100 satisfies the call condition of the test program. As a result of the identification in step 501, when the collaborative robot 100 satisfies the call condition, the robot control unit 160 performs step 503. When the call condition is not satisfied, the robot control unit 160 performs step 501 again. In this case, the call condition refers to a condition that satisfies at least one of the starting-on of the collaborative robot 100 and the completion of task performance of the collaborative robot 100.

In step 503, the robot control unit 160 calls the test program stored in the robot memory 150 and performs step 505. In step 505, the robot control unit 160 performs a test of the collaborative robot 100 based on the called test program.

More specifically, the test program may be a program designed to acquire sensing data of the same environment by fixing parameters according to the characteristics of the collaborative robot 100, the operating environment, and the purpose of health monitoring. The purpose of health monitoring may include the purpose of identifying the health of the collaborative robot 100 in a general situation and a situation in which there is a risk of faults and failures, depending on the industrial site in which the collaborative robot 100 is installed. In a general situation, the parameter for identifying the health may be set in a range of operation of 60 to 70% compared to the specification of the collaborative robot 100. In addition. In addition, in a situation where there is a risk of faults and failures, the parameter for identifying the health may be set in a range of operation of 90% compared to the specification of the collaborative robot 100 for a more detailed and strict diagnosis.

In addition, a plurality of control conditions may be set in the test program so that the collaborative robot 100 acquires sensing data in the same environment. In this case, the control condition may include a data condition, an action condition, a load condition, an operating condition, and an environmental condition. The data condition refers to a condition for acquiring sensing data in a situation having the same characteristics, such as the same sensor, the same unit, and the same collection period. The action condition refers to a condition for acquiring sensing data when the collaborative robot 100 performs the same action. The load condition refers to a condition for acquiring sensing data in a situation in which a load, an action pattern, etc. are constantly applied to the collaborative robot 100. The operating condition refers to a condition for acquiring sensing data in a situation where the operating time of the collaborative robot 100 is the same. Finally, the environmental condition refers to a condition for acquiring sensing data in an operating environment in which the collaborative robot 100 operates, that is, in a situation in which temperature, humidity, etc. are the same.

When the test is performed according to the test program in step 505, the robot control unit 160 performs step 507. In step 507, the robot control unit 160 acquires sensing data according to the test execution. The sensing data is sensing data including a location, speed, acceleration, temperature, voltage, current, torque, and noise for at least one joint provided in the collaborative robot 100 according to a test program, and may be raw data acquired from the robot sensor 120. In this case, since the test program acquires the sensing data in the same environment where the control condition is satisfied, the variable by the tester can be minimized, so that more accurate sensing data can be acquired.

In step 509, the robot control unit 160 analyzes the acquired sensing data. More specifically, the robot control unit 160 generates analysis data by calculating an average value of the sensing data acquired by a separate unit program corresponding to each joint. Next, in step 511, the robot control unit 160 transmits test data to the server 200. In this case, the test data includes the sensing data acquired in step 507 and analysis data generated by analyzing the sensing data in step 509.

Figure 6:
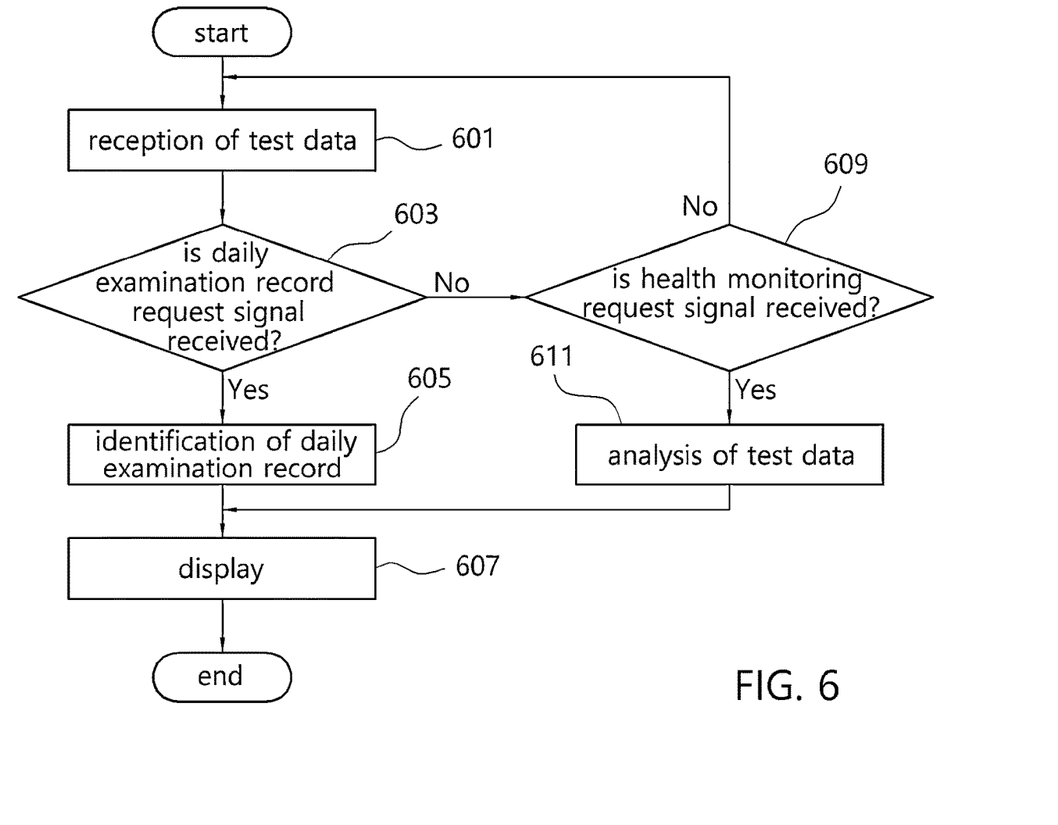
FIG. 6 is a flowchart illustrating a method for health monitoring of a collaborative robot in a monitoring device according to an embodiment of the present invention.
Figure 7:
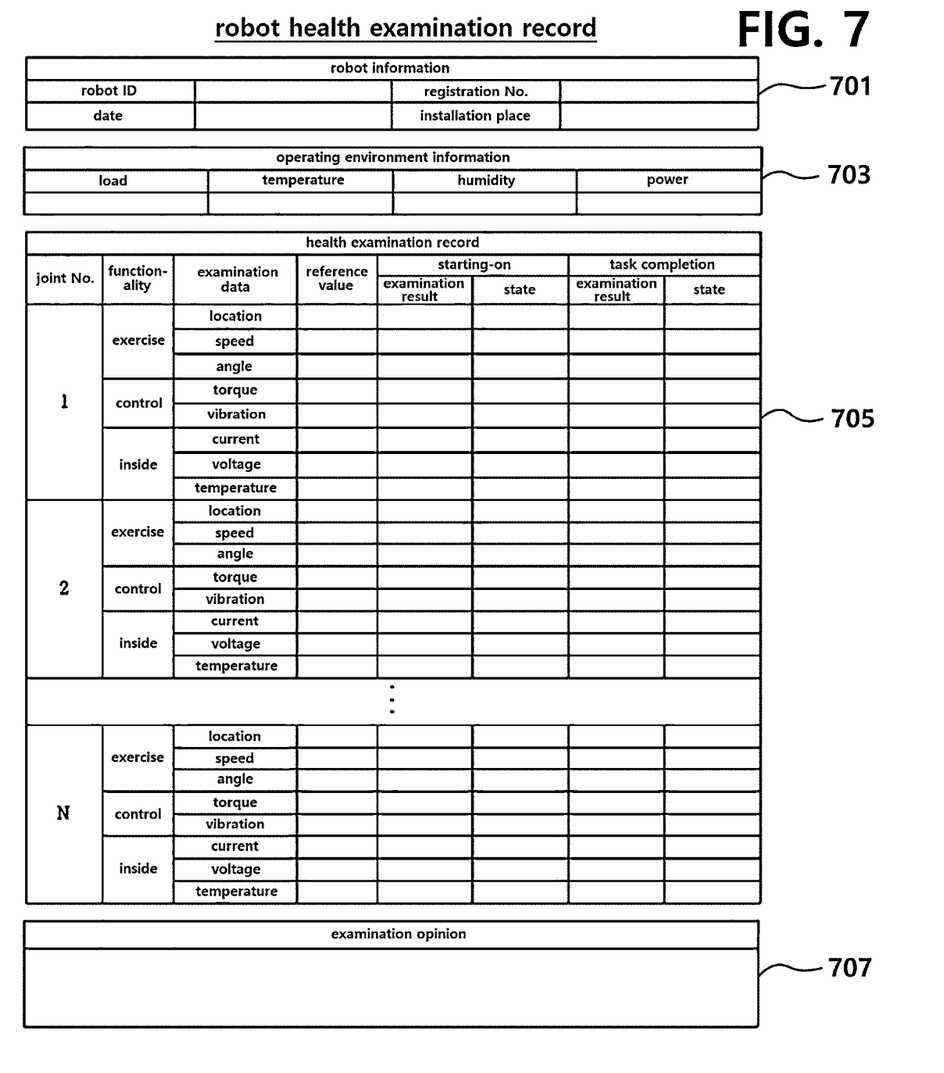
FIG. 7 is an exemplary screen diagram illustrating a daily examination record table of a collaborative robot illustrated in a monitoring device according to an embodiment of the present invention.
Figure 8:
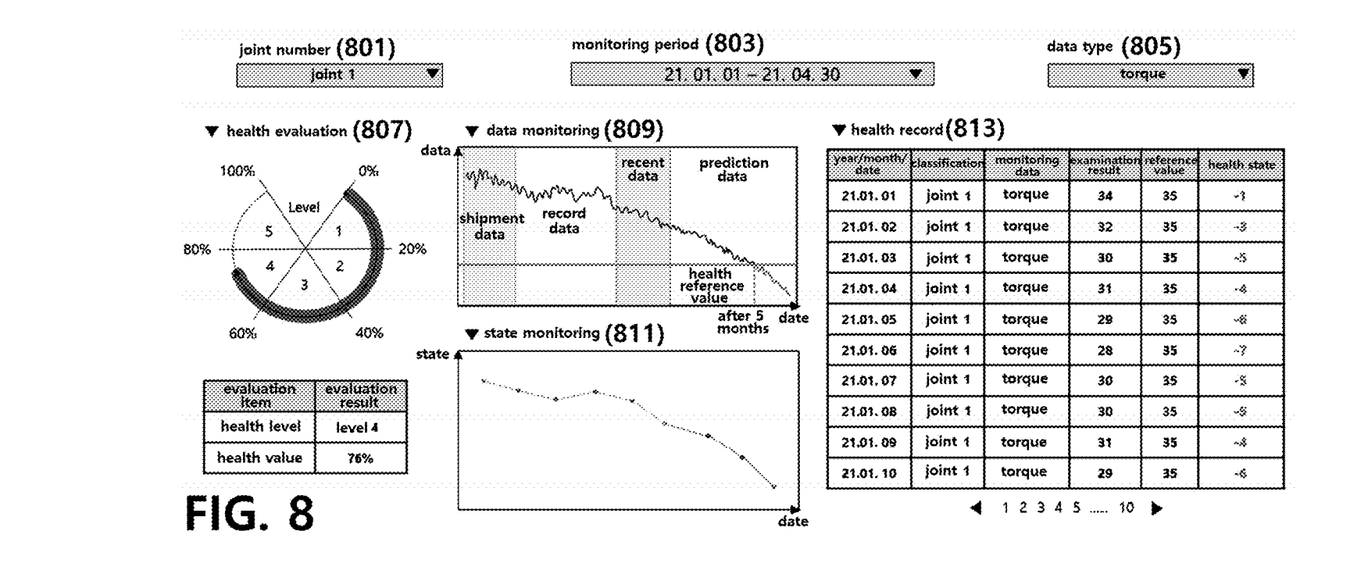
FIG. 8 is an exemplary screen diagram illustrating a health monitoring result of a collaborative robot illustrated in a monitoring device according to an embodiment of the present invention.

FIG. 6 is a flowchart illustrating a method for health monitoring of a collaborative robot in a monitoring device according to an embodiment of the present invention. FIG. 7 is an exemplary screen diagram illustrating a daily examination record table of a collaborative robot illustrated in a monitoring device according to an embodiment of the present invention. FIG. 8 is an exemplary screen diagram illustrating a health monitoring result of a collaborative robot illustrated in a monitoring device according to an embodiment of the present invention.

Referring to FIGS. 6 to 8, in step 601, the device control unit 350 receives test data from the server 200 through the device communication unit 310. In this case, the test data may include the sensing data that is raw data acquired by the robot sensor 120 of the collaborative robot 100 and the analysis data generated by analyzing the sensing data by the robot control unit 160.

In step 603, the device control unit 350 performs step 605 when an examination record request signal for identifying a daily examination record of the collaborative robot 100 is received from the device input unit 320, and when the examination record request signal is not received, the device control unit 350 performs step 609. In step 605, the device control unit 350 identifies the sensing data included in the received test data. The device control unit 305 inputs the identified sensing data to the examination record table as a daily examination record and performs step 607. In step 607, the device control unit 350 display units the examination record table in which the daily examination record is input on the device display unit 330.

This will be described in more detail with reference to FIG. 7. FIG. 7 illustrates an examination record table for recording daily examination records. The examination record table may largely include a robot information area 701, an operating environment information area 703, a health examination record area 705, and an examination opinion recording area 705.

In the robot information area 701, basic information on an identification (ID) assigned to the collaborative robot 100, a registration number of the collaborative robot 100, an operation date, an installation location, and the like is input. In the operating environment information 703, environmental information such as load, temperature, humidity, and power in the operation process of the collaborative robot 100 is input. In the health examination recording area 707, sensing data values for all joints provided in the collaborative robot 100 on the corresponding date are input. In particular, the sensing data value for all joints may include a sensing data value at a boot-up time of the collaborative robot 100 and a sensing data value at a task completion time. In addition, a reference data value for all joints, that is, a sensing data value at the time of shipment of the collaborative robot 100 is input in the health examination recording area 707. Through this, the health state of the collaborative robot 100 can be identified by using a difference value between the sensing data value at the time of shipment and the sensing data value at the current time. In addition, the personal opinion of the tester may be input in the examination opinion area 709 after identifying the health state of the collaborative robot 100.

In step 609, when the monitoring request signal for health monitoring is received, the device control unit 350 performs step 611, and when the monitoring request signal is not received, the device control unit 350 returns to step 601 to receive the test data from the server 200. In step 611, the device control unit 350 analyzes the test data received from the server 200 and performs step 607. In step 607, the device control unit 350 display units the health monitoring result of the collaborative robot 100 according to the analysis result of the test data on the device display unit 330.

This will be described in more detail using FIG. 8. FIG. 8 is a screen illustrating a health monitoring result of a collaborative robot. The health monitoring result may be display united by visualizing a joint number 801, a monitoring period 803, a data type 805, a health evaluation 807, a data monitoring 809, a state monitoring 811, and a health record 813.

The joint number 801 indicates a number assigned to each of a plurality of joints provided in the collaborative robot 100, and may select a joint using a combo box. The monitoring period 803 indicates a period during which the health of the collaborative robot 100 is monitored, and may select a monitoring period using the combo box. The data type 805 indicates a data type to be identified in the joint selected by the joint number 801, and may select a data type using the combo box. In this case, the data type may be selected from among the data types assigned to the joint number illustrated in FIG. 7, that is, location, speed, angle, torque, vibration, current, voltage, and temperature.

The health evaluation 807 indicates a health level and a health value as a graph. The tester may identify the health level and health value for the collaborative robot 100 over time, that is, during the monitoring period 803, through the health evaluation 807. The data monitoring 809 predicts and graphs a reference data value that is a sensing data value for the collaborative robot 100 at the time of shipment, a sensing data value for the collaborative robot 100 before the monitoring period, a sensing data value for the collaborative robot 100 during the monitoring period, and a sensing data value for the collaborative robot 100 after the monitoring period. To this end, the device control unit 350 may generate a data monitoring graph by using a change in the sensing data values. In addition, the device control unit 350 predicts the sensing data value for the collaborative robot 100 after the monitoring period 803 using the reference data value and the rate of change in the sensing data values of the monitoring period 803, and may indicate the prediction as a graph. Through this, the tester can predict when the collaborative robot 100 has a health reference value. The state monitoring 811 is a graph showing a change value of the analysis data.

The health record 813 is a table schematically showing the results of the examination record table illustrated in FIG. 7 by date. The tester can clearly identify the health state of the collaborative robot 100 in the monitoring period 803 by using the health record 813. Through this, the tester can continuously observe the aging state for each joint constituting the collaborative robot 100 under the same conditions, so that there is an effect that can prevent in advance the problem of deterioration of production efficiency or the occurrence of product failures due to the aging of the collaborative robot 100.

As described above, the method and system for health monitoring of a collaborative robot according to the present invention installs a program corresponding to each component having a collaborative robot in the collaborative robot, and performs health monitoring in real time or periodically based on the sensing data acquired according to the program. Accordingly, it has the effect of performing detailed diagnosis of each component constituting the collaborative robot.

In addition, a method and system for health monitoring of a collaborative robot according to the present invention can ensure the operation time of the program and the periodicity of the test by operating the program installed in the collaborative robot at the time of starting the collaborative robot and after performing the task of the collaborative robot.

The embodiments of the present invention disclosed in the present specification and drawings are merely provided for specific examples in order to easily explain the technical contents of the present invention and help the understanding of the present invention, and are not intended to limit the scope of the present invention. Therefore, the scope of the present invention should be construed as including all changes or modifications derived based on the technical spirit of the present invention in addition to the embodiments disclosed herein are included in the scope of the present invention.

What is claimed is:

1. A method for monitoring health of a robot, the robot comprising a joint, a memory, and a controller programmed to control the robot to perform tasks in connection with humans, the method comprising:

performing a first test for the joint based on a test program under a predefined control condition, the test program designed for the joint;
performing a second test for the joint multiple times under the same predefined control condition;
generating test data comprising sensing data multiple times, each set of test data corresponding to the first test and the second test;
generating a data monitoring graph based on a temporal change in the sensing data; and
displaying the data monitoring graph;
wherein the predefined control condition comprises a data condition, an action condition, a load condition, an operating condition, and an environmental condition,
wherein the data condition is configured to acquire the information sensing data using a prescribed sensor,
wherein the action condition is configured to acquire the sensing data when the robot performs a prescribed operation,
wherein the load condition is configured to acquire the sensing data when the robot operates with a prescribed load and a motion pattern,
wherein the operating condition is configured to acquire the sensing data while the robot operates at a prescribed run time, and
wherein the environmental condition is configured to acquire the sensing data in a prescribed temperature and prescribed humidity.

2. The method of claim 1, wherein the data monitoring graph comprises prediction of sensing data after a monitoring period, the monitoring period being a period in which the sensing data is acquired.

3. The method of claim 1, further comprising:
predicting when the predicted sensing data reaches a health reference value.

4. A system for monitoring health of a robot, the robot comprising a joint, a memory, and a controller programmed to control the robot to perform tasks in connection with humans, the system comprising at least one processor configured to:

perform a first test for the joint based on a test program under a predefined control condition, the test program designed for the joint;
perform a second test for the joint multiple times under the same predefined control condition;
generate test data comprising sensing data multiple times, each set of test data corresponding to the first test and the second test;
generate a data monitoring graph based on a temporal change in the sensing data; and
display the data monitoring graph;
wherein the predefined control condition comprises a data condition, an action condition, a load condition, an operating condition, and an environmental condition,
wherein the data condition is configured to acquire the sensing data using a prescribed sensor,
wherein the action condition is configured to acquire the sensing data when the robot performs a prescribed operation,
wherein the load condition is configured to acquire the sensing data when the robot operates with a prescribed load and a motion pattern,
wherein the operating condition is configured to acquire the sensing data while the robot operates at a prescribed run time, and wherein the environmental condition is configured to acquire the sensing data in a prescribed temperature and prescribed humidity.

5. At least one processor readable medium comprising processor readable instructions, such that when executed, causes at least one processor to monitor health of a robot, the robot comprising a joint, a memory, and a controller programmed to control the robot to perform tasks in connection with humans, the at least one processor is caused to:

perform a first test for the joint based on a test program under a predefined control condition, the test program designed for the joint;

perform a second test for the joint multiple times under the same predefined control condition;

generate test data comprising sensing data multiple times, each set of test data corresponding to the first test and the second test;

generate a data monitoring graph based on a temporal change in the sensing data; and display the data monitoring graph;

wherein the predefined control condition comprises a data condition, an action condition, a load condition, an operating condition, and an environmental condition, wherein the data condition is configured to acquire the sensing data using a prescribed sensor, wherein the action condition is configured to acquire the sensing data when the robot performs a prescribed operation, wherein the load condition is configured to acquire the sensing data when the robot operates with a prescribed load and a motion pattern, wherein the operating condition is configured to acquire the sensing data while the robot operates at a prescribed run time, and wherein the environmental condition is configured to acquire the sensing data in a prescribed temperature and prescribed humidity.

* * * * *